United States Patent
Brandts et al.

(10) Patent No.: US 10,540,815 B2
(45) Date of Patent: *Jan. 21, 2020

(54) DYNAMIC RISK STRUCTURE CREATION SYSTEMS AND/OR METHODS OF MAKING THE SAME

(71) Applicant: BWISE B.V., Rosmalen (NL)

(72) Inventors: Luc Brandts, Rosmalen (NL); Erik M. M. Voorbraak, Rosmalen (NL); Gerrit Hendrik Smit, Rosmalen (NL)

(73) Assignee: BWISE B.V., 's-Hertogenbosch (NL)

( * ) Notice: Subject to any disclaimer, the term of this patent is extended or adjusted under 35 U.S.C. 154(b) by 0 days.

This patent is subject to a terminal disclaimer.

(21) Appl. No.: 16/228,937

(22) Filed: Dec. 21, 2018

(65) Prior Publication Data

US 2019/0130643 A1 May 2, 2019

Related U.S. Application Data

(63) Continuation of application No. 16/031,770, filed on Jul. 10, 2018, now Pat. No. 10,192,356, which is a
(Continued)

(51) Int. Cl.
*G06Q 10/06* (2012.01)
*G06T 17/10* (2006.01)
(Continued)

(52) U.S. Cl.
CPC ......... *G06T 17/10* (2013.01); *G06Q 10/0635* (2013.01); *G06T 11/206* (2013.01); *G06T 19/20* (2013.01); *G06T 2219/2004* (2013.01)

(58) Field of Classification Search
USPC ....................................................... 705/7.28
See application file for complete search history.

(56) References Cited

U.S. PATENT DOCUMENTS

| | | | | |
|---|---|---|---|---|
| 6,370,539 B1 * | 4/2002 | Ashby | ..... | G01C 21/26 707/999.101 |
| 7,319,971 B2 * | 1/2008 | Abrahams | ..... | G06Q 10/0635 705/7.28 |

(Continued)

FOREIGN PATENT DOCUMENTS

WO    WO 2013/177178    11/2013

OTHER PUBLICATIONS

D. Puspasari, M. Kasfu Hammi, M. Sattar and R. Nusa, "Designing a tool for IT Governance Risk Compliance: A case study," 2011 International Conference on Advanced Computer Science and Information Systems, Jakarta, 2011, pp. 311-316. (Year: 2011).*

(Continued)

*Primary Examiner* — Eric W Stamber
*Assistant Examiner* — George H Walker, III
(74) *Attorney, Agent, or Firm* — Barnes & Thornburg LLP

(57) ABSTRACT

A governance, risk management, and compliance (GRC) computer system is provided that includes at least one processor, a user input device, and a storage system that stores meta-model. The meta-model includes at least one process element, a plurality of dynamic risk elements, and a plurality of dynamic control elements. The risk meta-model is loaded from the storage system. Input is accepted from the user input device for creating a new dynamic risk model based on the loaded extended risk meta-model. At least one process element is added to the new dynamic risk model based on user provided input and the extended risk meta-model. A first dynamic risk element is added from the plurality of dynamic risk elements based on user provided input. A risk type of the first dynamic risk element is determined based on user provided input.

20 Claims, 11 Drawing Sheets

Related U.S. Application Data continuation of application No. 13/835,458, filed on Mar. 15, 2013, now Pat. No. 10,037,623.

(51) Int. Cl.
*G06T 11/20* (2006.01)
*G06T 19/20* (2011.01)

(56) References Cited

U.S. PATENT DOCUMENTS

| | | | |
|---|---|---|---|
| 7,472,141 B1 | 12/2008 | Shah | |
| 7,593,859 B1* | 9/2009 | Owens | G06Q 10/0635 |
| | | | 705/7.28 |
| 8,010,398 B2 | 8/2011 | Abrahams | |
| 8,370,471 B2 | 2/2013 | Madej | |
| 8,635,179 B2 | 1/2014 | Cao | |
| 2006/0265257 A1 | 11/2006 | Pulfer | |
| 2007/0233508 A1* | 10/2007 | Gillespie | G06Q 10/0635 |
| | | | 705/7.28 |
| 2008/0120153 A1 | 5/2008 | Nonemacher | |
| 2008/0208655 A1 | 8/2008 | Russo | |
| 2008/0208859 A1* | 8/2008 | Cohen | G06Q 10/063 |
| 2009/0083087 A1* | 3/2009 | Wolter | G06Q 10/00 |
| | | | 705/7.27 |
| 2009/0132562 A1 | 5/2009 | Mehr | |
| 2009/0228316 A1* | 9/2009 | Foley | G06Q 10/0635 |
| | | | 705/7.28 |
| 2009/0299804 A1 | 12/2009 | Owens | |
| 2010/0114634 A1* | 5/2010 | Christiansen | G06Q 10/06 |
| | | | 705/7.28 |
| 2010/0161371 A1* | 6/2010 | Cantor | G06Q 10/063 |
| | | | 705/7.11 |
| 2010/0179847 A1* | 7/2010 | Cope | G06Q 10/06311 |
| | | | 705/7.28 |
| 2010/0235839 A1 | 9/2010 | Hu | |
| 2011/0218843 A1 | 9/2011 | Goel | |
| 2011/0264483 A1* | 10/2011 | Nezhad | G06Q 10/06 |
| | | | 705/7.27 |
| 2012/0029958 A1 | 2/2012 | Ayed | |
| 2012/0047178 A1* | 2/2012 | Raghavendra | G06Q 10/00 |
| | | | 707/791 |
| 2012/0059683 A1 | 3/2012 | Opalach | |
| 2012/0166246 A1 | 6/2012 | Simon | |
| 2012/0198025 A1 | 8/2012 | Wang | |
| 2013/0096892 A1* | 4/2013 | Essa | G06F 17/18 |
| | | | 703/2 |
| 2013/0290067 A1* | 10/2013 | Barton | G06Q 10/06 |
| | | | 705/7.28 |
| 2013/0311242 A1 | 11/2013 | Duftler | |
| 2014/0058789 A1 | 2/2014 | Doehring | |
| 2014/0067836 A1 | 3/2014 | Holmes | |
| 2014/0278732 A1 | 9/2014 | Brandts | |
| 2018/0322696 A1 | 11/2018 | Brandts | |

OTHER PUBLICATIONS

Rozinat, Anne, "Disco Tour", fluxicon, pp. 1-13, Friday, Jun. 28, 2013.

* cited by examiner

| Object Definition | | |
|---|---|---|
| Field 1 | Field type text | No Condition |
| Field 2 | Formatted text | No Condition |
| Field 3 | Drop-down values | No Condition |
| Field 4 | Drop-down values | Visible if field 3=value X |
| Field 5 | Drop-down values | Visible if field 3=value Y |
| Field 6 | Formatted text | Visible if field 3=value Z |
| Field 7 | Date | Visible if field 3=value Q |
| Field 8 | Object reference | Visible if field 3=value Q |
| Field 9 | Document reference | Visible if field 3=value R |

FIG. 6A

| Risk Internal Fraud | | |
|---|---|---|
| Field 1: Name | Field type text | Internal Fraud |
| Field 2: Description | Formatted text | The risk of fraudulent actions taken by employees |
| Field 3: Type | Drop-down values | Enterprise Risk |
| Field 4: Risk Response | Drop-down values | Treat |
| Field 5 | Drop-down values | Invisible |
| Field 6: Management response | Formatted text | Management believes this risk is well managed by the implemented controls, as demonstrated in the latest test results |
| Field 7 | Date | Invisible |
| Field 8 | Object reference | Invisible |
| Field 9 | Document reference | Invisible |

FIG. 6B

DYNAMIC RISK STRUCTURE CREATION SYSTEMS AND/OR METHODS OF MAKING THE SAME

CROSS REFERENCE TO RELATED APPLICATION

This application is a continuation of U.S. application Ser. No. 16/031,770 filed Jul. 10, 2018, which is a continuation of U.S. application Ser. No. 13/835,458 filed Mar. 15, 2013, now U.S. Pat. No. 10,037,623 issued Jul. 31, 2018, the contents of each being hereby incorporated by reference.

TECHNICAL OVERVIEW

The technology herein relates to governance, risk management, and compliance computing systems for people, companies, and organizations.

BACKGROUND

Managing risk is an everyday occurrence for most people. We manage risk of theft or home intrusion by setting an alarm system or locking the door when we leave our homes. We plan for natural disasters (e.g., hurricane fire, etc) by storing important documents in a safe or safety deposit box and stocking extra food and water. However, personal (or family) risk management is usually an ad hoc process with no preset structure (e.g., a document or requirement specification) for how risks are to be managed.

Organizations and companies also manage risk, but often on a larger and more complex scale as compared to individualized risk. Organizational risks include financial issues (e.g., the price of oil spiking), environmental issues (how to respond to a tornado warning), accidents (a misrouted sales purchase), deliberate attacks (a computer security breach), legal issues (complying with various taxes, regulations, and laws), and many more.

In addition to managing risks, organizations are also generally concerned with governance and compliance issues. Governance is the ability to ensure that reliable and accurate information is given to the correct people within an organization (e.g., senior level executives). Compliance is how a company complies with the legal, statutory, contractual, etc. issues that affect the company. Taken together governance, risk management, and compliance (GRC) are of central concern to how organizations (e.g., publically traded companies) operate. Given the importance of these areas, computerized solutions have been developed to assist in addressing the problems present in these areas.

Computer-based GRC solutions provide functionality to model risk structures (e.g., create a risk model) that are used by organizations to manage their risk. Generally speaking, risk structures (or models) include three separate model elements: (1) object elements; (2) risk elements; and (3) control elements. With these three elements, a risk model can model risks that are associated with (1) objects (e.g., business processes and objectives, IT assets, financial information, projects, etc) and how the (2) risks (e.g., what could go wrong) for those objects are to be mitigated or (3) controlled.

With this basic understanding of how a risk model can be created, a set of requirements, called a meta-model, are defined to ensure that all risk models are appropriately created. Specifically, a meta-model provides a defined structure from which a model is created. For example, the definitions in the meta-model may prevent controls from being directly associated with IT assets and instead require all IT assets to have an associated risk. Without this type of underlying structural requirement, it may be difficult to successfully conduct audits, run risk assessments, or do required tasks such as risk reporting because there are no verifiable rules regarding how each model was initially created.

However, fixed meta-models are also problematic for organizations because they can be difficult to change once defined. In particular, a programmer or other technical person may be needed to adjust the meta-model. When the technical complexity of modifying a meta-model is combined with an initially provided general meta-model (e.g., one that is not specific to any one organization) it may be difficult for an organization to properly define more specific/complex risk models. In other words, organizations may purchase or be provided with a generic meta-model that can be used to model their specific risk structures. However, the resulting risk structures may be lacking in terms of complexity and/or specificity because the provided meta-model is generic (e.g., particular scenarios of the organization may not be modeled correctly in a resulting risk structure).

For example, risks and controls may have relations to multiple other model elements (e.g. a risk of business process, a first object model element, may also impact a business objective, a second object model element, or may have a relation to an IT asset, a third object model element), such that certain relationships are no longer easily supported by the object—risk—control relationships that are defined in an associated fixed or base meta-model. However, an organization may desire to distinguish between different types of mitigating measures—e.g., controls, risk measures, policies, where each one of these elements needs to be documented differently at different levels of detail. It may also be necessary to distinguish between different risk types and/or differentiate between abstraction levels—e.g., operational risks may require more detail than strategic risks. Modeling these types of aspects with a fixed meta-model approach can be difficult because one cannot differentiate between, for example, multiple control elements such as risk measures and policies.

An alternative to the fixed meta-model approach is a completely custom solution. However, while a custom solution may better define the needs of an individual organization, there are downsides to this approach. For example, custom systems are typically very expensive (more so than the fixed systems) as a dedicated team is needed to first implement the base meta-model and it's associated supporting infrastructure (e.g., how to create a model from the meta-model). Accordingly, the total cost of ownership of such a system is relatively high because upgrading the system for future releases (e.g., that include changes to the meta-model) may require re-customization and adaptation of previous customizations. This may make it difficult to successfully upgrade systems to future releases. Further, when modifying a customized system (e.g., adjusting a previously developed meta-model), hard-coded changes may be needed that may be affect the entire system. In other words, models in the system that have been created with a prior meta-model may be adversely affected by these changes. An additional consideration is that while organizations may be knowledgeable about their own risks, they may also have trouble correctly modeling such risks in a manner that provides effective audits, risk assessments, and risk reporting, etc. (e.g., risk modeling and setup may require specialized knowledge).

In view of these and other problems, there is a need for technical improvements in this field so that organizations can fit specific processes, risks, controls, etc into a workable and flexible environment that provides the benefits of a GRC system. In other words, a GRC system is needed that while providing some defined structure in terms of a meta-model also allows implementation of organization specific risk models.

SUMMARY

In certain example embodiments, a GRC computer system is includes a stored fixed meta-model and functionality (e.g., computer code) to implement dynamic risk models based on the stored fixed meta-model. The GRC computer system may provide functionality that allows organizations to extend the fixed meta-model to thereby create an extended meta-model that is based on the fixed meta-model.

In certain examples, dynamic risk models are implemented with conditional object fields defined in the respective dynamic risk models. Specifically, model designers provide input to conditionally define how elements within a dynamic risk model will be implemented. In certain examples, conditional formatting is defined in an extended meta-model and provides dynamic functionality for subsequently implemented risk models. With this approach, risk structures (models) can become dynamic in nature, based on user input, rather than being hard-coded or configured across an implemented system. As a result, large amounts of custom code may not be required to achieve company-specific risk structures.

In certain example embodiments, a governance, risk management, and compliance (GRC) computer system is provided that includes at least one processor, a user input device, and a storage system that stores an extended risk meta-model. The extended risk meta-model provided a set of rules that are enforced by the GRC computer system as to how dynamic risk models for the organization can be created. The extended risk meta-model includes at least one process element, a plurality of dynamic risk elements, and a plurality of dynamic control elements. The risk meta-model is loaded from the storage system. Input is accepted from the user input device for creating a new dynamic risk model based on the loaded extended risk meta-model. At least one process element is added to the new dynamic risk model based on user provided input and the extended risk meta-model. A first dynamic risk element is added from the plurality of dynamic risk elements based on user provided input. A risk type of the first dynamic risk element is determined based on user provided input.

In certain examples, this determination is achieved automatically based on how the meta-model is defined (e.g., the properties of the newly added element determine its type and/or what type of elements it is associated with). The added first dynamic risk element is linked to the added process element based on a first relationship that is defined in the extended risk meta-model. A first dynamic control element is added based on user provided input and the extended risk meta-model. A control type of the first dynamic control element is determined based on user provided input. The added first dynamic control element is linked to the added first dynamic risk element based on a second relationship that is defined in the extended risk meta-model.

In certain examples the elements of the new risk model include object properties. The object properties may be settable based on user input and/or based on how the object properties are defined in the based meta-model. An object property of an element may determine, at least in part, another object property of the element. In certain examples, an object property of one object may determine, at least in part, an object property of another element. In certain examples, the visibility of a field of an element is controlled based on a value of another property of that same element or another element.

In certain example embodiments, a GRC system may be provided for extending a base meta-model. A new meta-model element is created from a base meta-model element. A relationship in the extended meta-model is defined between the new meta-model element and at least one existing meta-model element. A conditional property of the new meta-model element is set such that when the new meta-model element is used in a subsequent risk model the implemented element changes based on how the conditional property is defined in the subsequent risk model. Accordingly, created model elements that are based on the new meta-model element (e.g., instances of the new meta-model element) may be defined differently depending on how the conditional property is set for each instance within respective risk models.

In certain example embodiments, a method of implementing a risk framework for governance, risk management, and compliance on a computing system for an organization from a base risk meta-model is provided. The method includes loading, from a computer storage medium, a base risk meta-model that includes at least a first base meta-model element. Based on user provided input a new meta-model element is created that is based on the first base meta-model element. An organization risk meta-model is created for the organization via the computing system and is based on the new meta-model element and the base risk meta-model. At least one relationship is formed between the new meta-model element and at least one other meta-model element in the created organization meta-model. At least one conditional aspect of the new meta-model element is set in the created organization risk meta-model based on user provided input.

In certain example embodiments, the new meta-model element includes a plurality of user configurable properties that determine how a corresponding model element that is an instance of the new meta-model element will be shown and/or presented in a created risk model.

In certain example embodiments, a value and/or visibility of a first user configurable property for the corresponding model element is determined based on a value of a second user configurable property of the corresponding model element, the plurality of user configurable properties including the first and second user configurable properties.

In certain example embodiments, the base risk meta-model includes a plurality of base meta-model elements that includes the first base meta-model element, the plurality of base meta-model elements including at least one base control meta-model element, at least one base risk meta-model element, and at least one base process meta-model element.

In certain example embodiments, the base risk meta-model is encapsulated with an interface layer such that the new meta-model element is created through use of at least one interface of the interface layer that is provided to the first base meta-model element.

In certain example embodiments, at least some portion of the created organization risk meta-model is output to a display. In other words, information or data about the created organization risk meta-model is presented to a user on a display device.

In certain example embodiments, the GRC system outputs, to a display device, the created model in a tree-view format. In certain examples, the model is output in a bow-tie format.

The features described herein may be combined to form additional embodiments and sub-elements of certain embodiments may form yet further embodiments.

BRIEF DESCRIPTION OF THE DRAWINGS

These and other features and advantages will be better and more completely understood by referring to the following detailed description of non-limiting illustrative example embodiments in conjunction with the drawings of which:

FIGS. 6A and 6B show example properties of a risk model element according to certain example embodiments;

DETAILED DESCRIPTION OF NON-LIMITING EXAMPLE EMBODIMENTS

Figure 1:
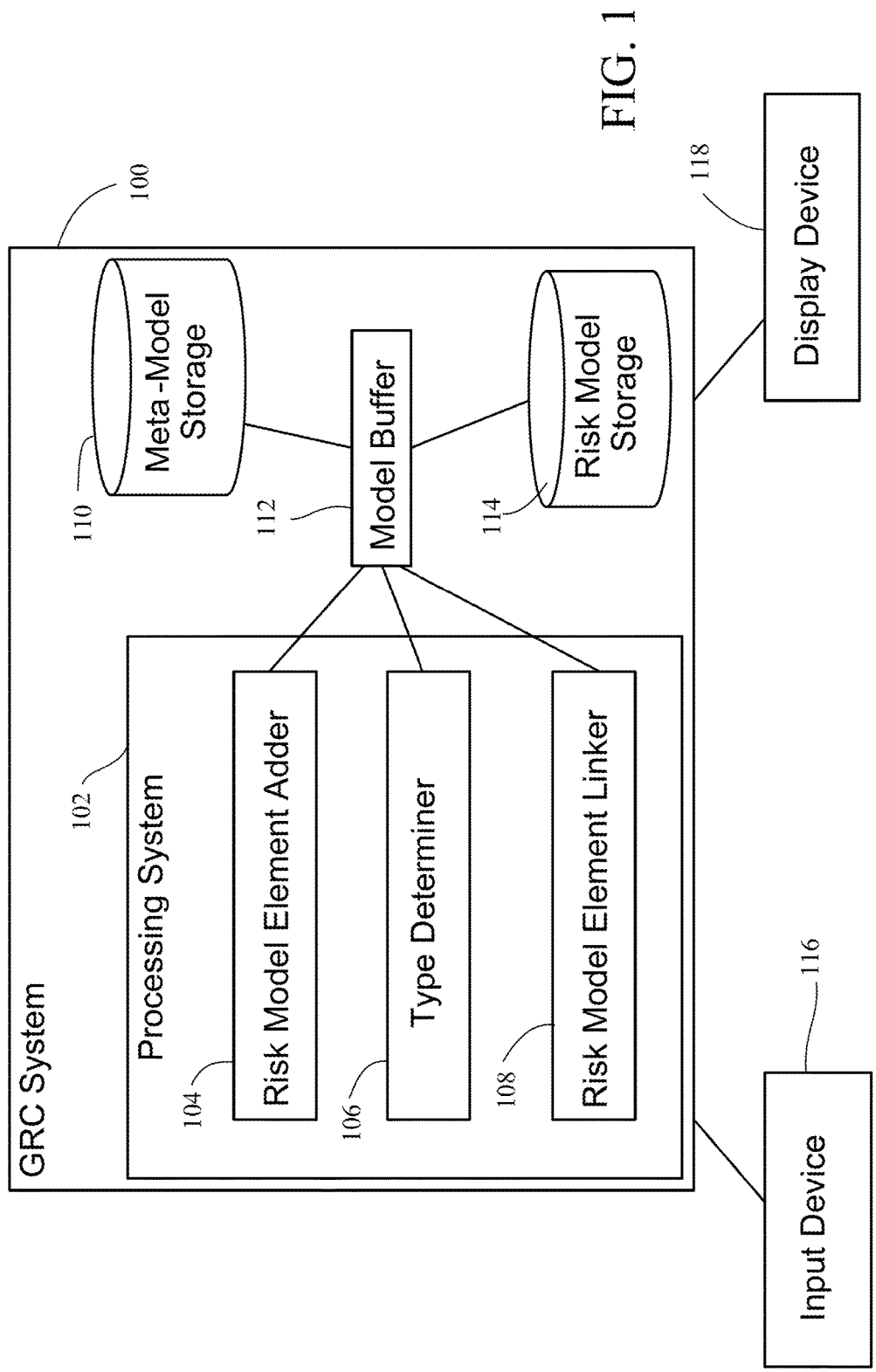
FIG. 1 is a block diagram of an example GRC system.

FIG. 1 is a block diagram of an example GRC system. A governance, risk management, and compliance (GRC) computer system 100 provides organizations with the ability to model risk structures so that business processes, IT assets, business objectives, financial information, etc. can have their risks expressed in the GRC system along with how each risk (or other model element) is going to be mitigated (controlled) by means of measures, controls, etc.

A GRC system provides functionality to allow users to create specific risk models from a meta-model. Generally speaking, a meta-model in a GRC system is a model that defines how specific risk models are implemented or created by GRC system users. In other words, a meta-model provides constraints, which are enforced by the GRC system, on the structure of all implemented risk models.

Figure 4A:
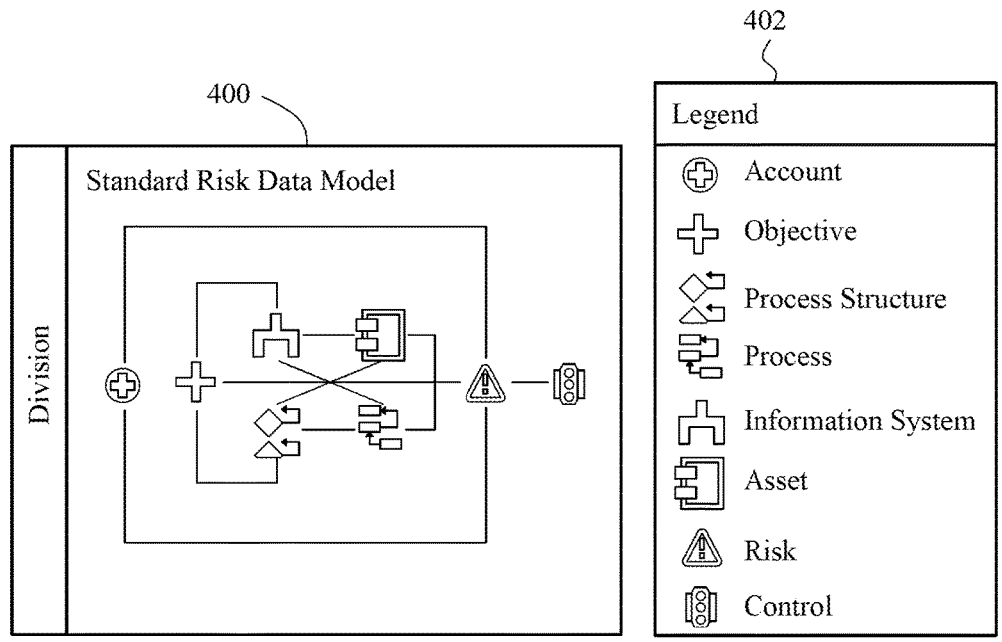
FIGS. 4A, 4B, 5A, and 5B show example risk models according to certain example embodiments.
Figure 4B:
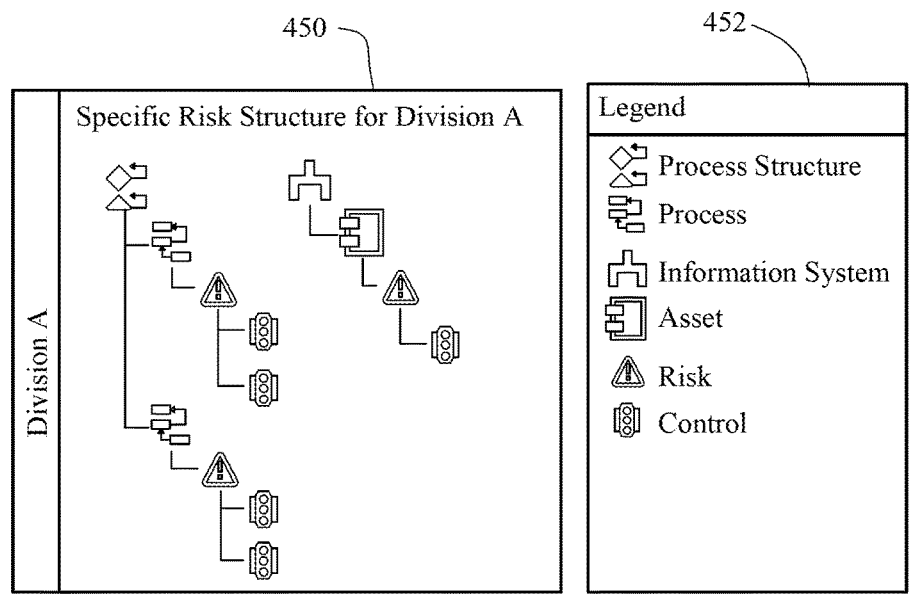

Meta-models include meta-model elements that form the basis for each implemented model element. As described throughout this description, elements include individual items within a meta-model (meta-model elements) and individual items within a model (model elements). For example, the icons shown in FIG. 4A represent "meta-model elements" and the icons in FIG. 4B represent "model elements."

Returning to FIG. 1, the GRC system includes a computer processing system 102 configured, programmed (e.g., via software and/or hardware), and/or structured with one or more processing components. The GRC system 100 communicates with an input device 116 (e.g., keyboard, mouse) that is provided locally or remotely (e.g., input is provided over the Internet).

A risk model element adder 102 adds a new model element based on a meta-model (for example FIG. 5A), which is stored in meta-model storage 100, to a risk model (for example FIG. 5B) in accordance with input from input device 116. For example, the GRC system issues instructions to create a new model element in model buffer 112 based on the meta-model that is stored in storage 110. The newly created model element is added to a new or existing risk model that is then stored in risk model storage 114.

Either before or after the new model element is added to the risk model, a type determiner 106 determines the type of the newly added model element. For example, a meta-model may include multiple meta-model risk elements such as risk and vulnerability "types." Example vulnerability types may include operational risks and enterprise risk. The definitions, requirements, properties, etc. for each of these types may vary according to the definitions provided to the GRC system. Flexibility in defining how model elements may be related to one another can facilitate the creation of improved risk management and/or assessment for decision makers within an organization.

Once the new model element is added to the risk model it is linked to other model elements of the model through the use of the risk model element linker 108. Specifically, a relationship between the new model element and at least one other model element is defined. The relationship that is defined for the new risk model may be based on the underlying constraints of the meta-model that are enforced by the GRC computer system. For example, risk elements may be linked to process elements, whereas process elements are prohibited from directly relating to control elements. The relationships between model elements may be expressed in terms of a tree view or a bow-tie model by being output to the display device 118. In other words, data or information that corresponds to the model (or meta-model) may be output to a display device such that a tree view is displayed thereon.

In certain example embodiments, a model element is linked automatically based on how it is defined in the meta-model. For example, a model element may be restricted to what other element types it may be associated with in a risk model. These definitions may be defined by a meta-model designer in a meta-model prior to creation of the new model. In certain example embodiments, the addition of a first element type to a risk model may "trigger" the addition of a second element type that is required (based on the meta-model definition) for all models that include the first element type. In certain example embodiments, a user provides input to expressly link the newly added element to another element in the model. Accordingly, an example GRC system may provide conditional logic for all (or some) element types of the newly created model.

Figure 2:
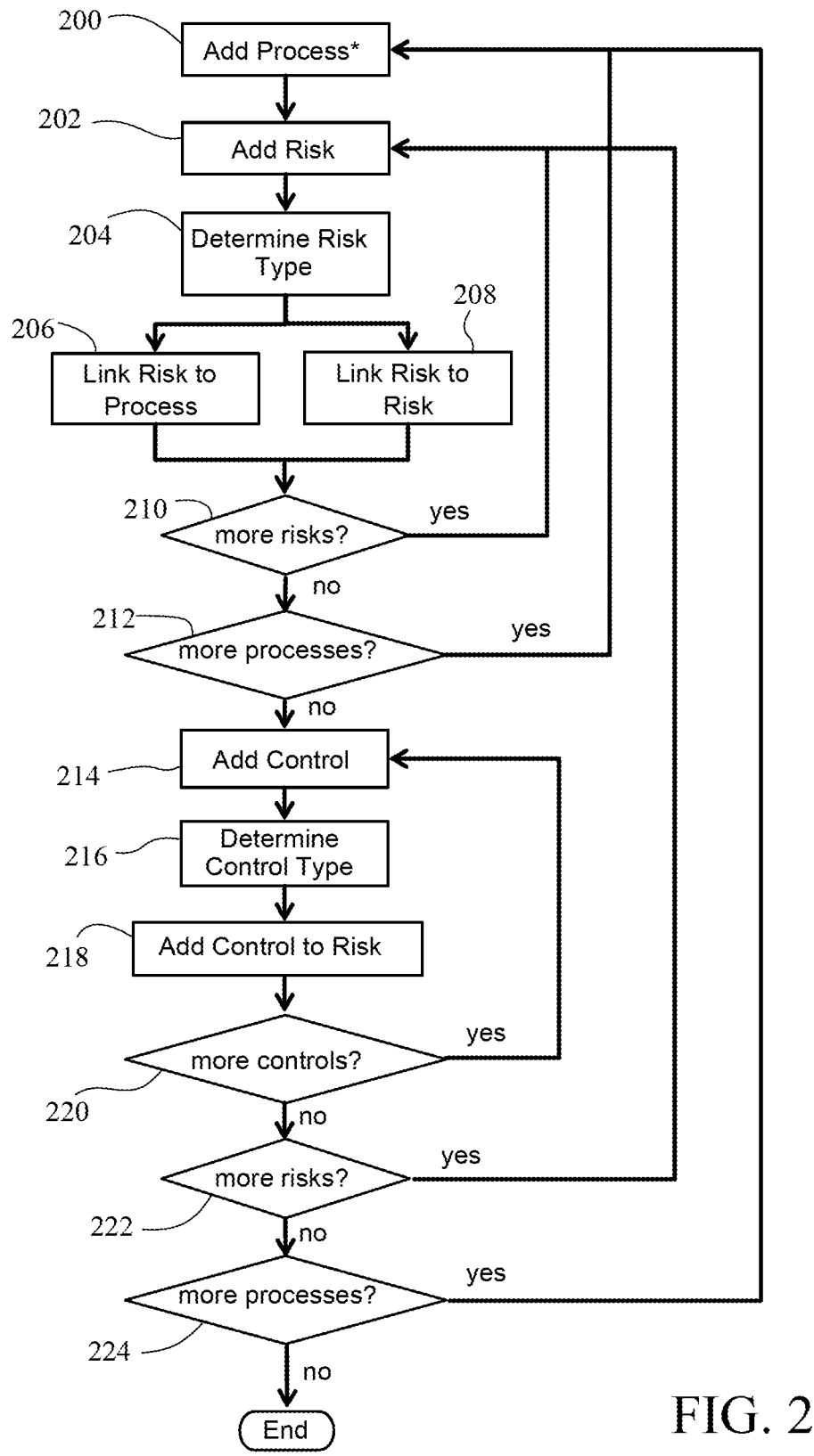
FIG. 2 is a flow chart of an example process for creating a risk model from a meta-model according to certain example embodiments.

FIG. 2 is a flow chart that illustrates a non-limiting example of how the above described GRC system may be used to create a risk model from a meta-model. From a provided meta-model, a user adds a new process model element to a risk model in step 200 and then a new risk model element in step 202. When the new risk model element is being added, or after it is added to the model, a risk type is determined for the newly added risk model element in step 204. In certain example embodiments, the risk types are pre-defined types determined in accordance with how that particular model element is defined in the meta-model. In certain example embodiments, risk types are created by the user adding the risk element to the risk model. Example risk types include enterprise risk, operational risk, safety, health and environment, and vulnerability.

In step 206, the newly added risk model element is linked to a process model element of the risk model. Alternatively, or additionally, in step 208, the newly added risk model element is linked to another risk model element of the risk model.

In step 210, the user can repeat the risk addition steps to add further risk elements for the previously added process element. In step 212, more process element can be added by repeating the process and risk steps. In certain example embodiments, all process elements must have at least one risk element associated therewith. This may be a constraint that is enforced by the GRC system (e.g., the system will not allow a model to be created that does not have a risk element associated with each process element).

In step 214, a control model element based on a control meta-model element may be added to the risk model. A control type for the newly added control model element is determined in step 216. The added control model element is linked or added to a risk model element of the risk model in step 218.

In step 20, if the user creating the new model desires to include more control model elements then the control addition steps repeat. Similarly, if the user desires to add further risks and/or processes to the model the associated steps are repeated per step 222 and/or 224.

Once the created risk model is completed it may be relied upon to provide improved risk monitoring to interested parties in an organization. For example, improved recognition, assessment, and monitoring of risks and controls may help with risk management and help to ensure that proper business decisions are taken.

Figure 3:
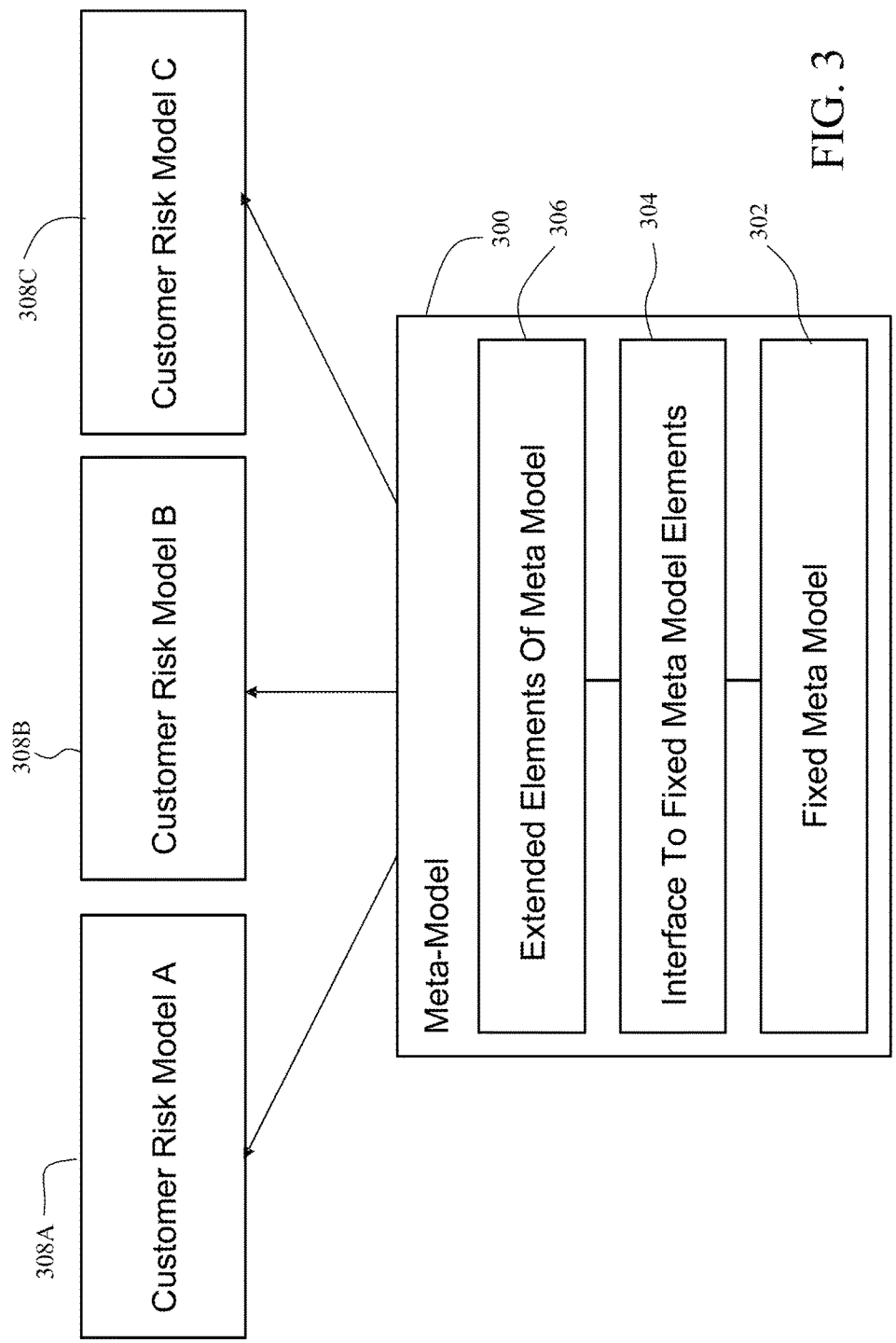
FIG. 3 is a block diagram of example risk models implemented according to an extended meta-model.

FIG. 3 is a block diagram of example risk models implemented according to an extended meta-model. As discussed above, a risk model may be derived or created from a meta-model.

A meta-model can be thought of as a set of rules that define how a model can be created. For example, a meta-model restricts how elements can be associated with each other by only allowing elements of type A to be directly linked with type B elements, but not type C elements. Using a meta-model provides users with a framework from which their models must be developed. This can provide efficiency gains because a well defined meta-model prevents mistakes from being included in a resulting model. In other words, it is easier to operate in an environment that has some rules rather than an environment that has almost no rules.

An example GRC computer system includes a storage area (e.g., cloud storage, network storage, etc) for meta-model 300. Meta-model 300 is based on a fixed meta-model 302. The fixed meta-model 302 may be a basic meta-model that is generic and developed by a system vendor. In other words, the fixed meta-model, while having some aspects relevant to a specific organization, may still need to be expanded/enhanced to properly "fit" the requirements of the organization. In certain examples, users may modify the base meta-model by adding custom elements or the like. But such custom implementations may not be desirable. For example, by customizing the fixed meta-model, later software updates that also update the fixed meta-model may either destroy the custom meta-model or prevent an upgrade (e.g., due to incompatibility).

An interface 304 to the fixed meta-model (and the meta-model elements therein) is provided to allow users to access the fixed meta-model without modifying its basic structure. By using the interface 304, an organization may define extended elements of meta-model 306 that are specific to the organization. Through such an implementation, organizations may "extend" a provided meta-model with specific requirements, but maintain the underlying basic meta-model so that GRC system upgrades (that modify the fixed meta-model) and the like will not be as much of an issue in the future.

Once meta-model 300 is created, a customer may configure specific models 308A, 308B, 308C that are constrained by the meta-model 300 (e.g., as opposed to just be constrained by fixed meta-model 302). These different models may be based on different departments within an organization or may represent different types of risks that are being modeled (e.g., strategic enterprise versus operation risks).

As a result of these techniques, further upgrades to the underlying fixed meta-model may be provided and the interface layer may assist in maintaining compatibility between implemented models that were created/configured with a prior meta-model version and models created with the current, different, meta-model version. Accordingly, a first fixed meta-model may be changed to (e.g., replaced with) a second, different, fixed meta-model (e.g., as a result of a GRC system upgrade), but the extended meta-model that is provided via the interface layer 304 may still support customer specific models (306a, 306b, 306c). The functionality and processes initially defined in customer specific models 306a, 306b, and 306c will still properly be defined after the upgrade/replacement of the underlying fixed meta-model because the extended meta-model may be unchanged from the perspective of the implemented/configured customer specific models. This technique can then facilitate continuous technology upgrades while keeping the configured meta-model useable by organizations (e.g., the configured meta-model can be unchanged from the perspective of the previously implemented models).

In contrast, an organization using a traditional GRC system may implement customizations onto to the provided meta-model in the form of new element definitions or the like. As an example, an organization may add an assessment risk type to a base meta-model. However, as this new element is custom, it will likely be overwritten when the GRC system is updated to a new version that includes a newly released meta-model. As a result, created risk models that are based on the custom meta-model will be "broken" (either because the model no longer works or works incorrectly) and the organization will be forced to re-implement their customizations for each newly released meta-model to ensure compatibility.

FIGS. 4A, 4B, 5A, and 5B show example risk models according to certain example embodiments. Standard risk data model 400 is an example meta-model that is provided according to certain example embodiments. Legend 402 shows the different meta-model elements that are included in this meta-model. Non-limiting example definitions of the meta model elements in Legend 402 include: 1) Account: a financial account in the General Ledger of a company—e.g., items on the balance sheet or the Profit & Loss statement; 2) Objective: strategic, operational, or regulatory objectives—e.g., something the organization wants to achieve; 3) Process structure: a high level process such as an end-to-end process like Purchase to Pay or Hire to Retire process); 4) Process: a set of interrelated activities with a process flow, detailed process description, part of the process structure; 5) Information system: a computer system, an asset group in an organization; 6) Asset: a piece of hardware, software, or network components—these can be related to IT, but also may be broader, such as buildings, etc; 7) Risk: something that can go wrong and adversely affects reaching an objective; 8) Control: a mitigating measure to prevent a risk from occurring (e.g., lowering the frequency) and/or reducing its impact.

Specific risk structure for division A 450 is a risk model based on meta-model 400 of FIG. 4A. Legend 452 shows the definitions of the model elements that are included in model 450. Note that not all of the meta-model elements need to be implemented in a model.

Client configured risk data model 500 is based on meta-model 400 and has been extended according to specific organization requirements. Another meta-model risk element, vulnerability, has been added along with another meta-model control element, policy. These new meta-model elements may have been extended according to the above described interface to the basic meta-model. Legend 502 shows the different meta-model elements that are possible to be included in the meta-model 500.

Figure 5A:
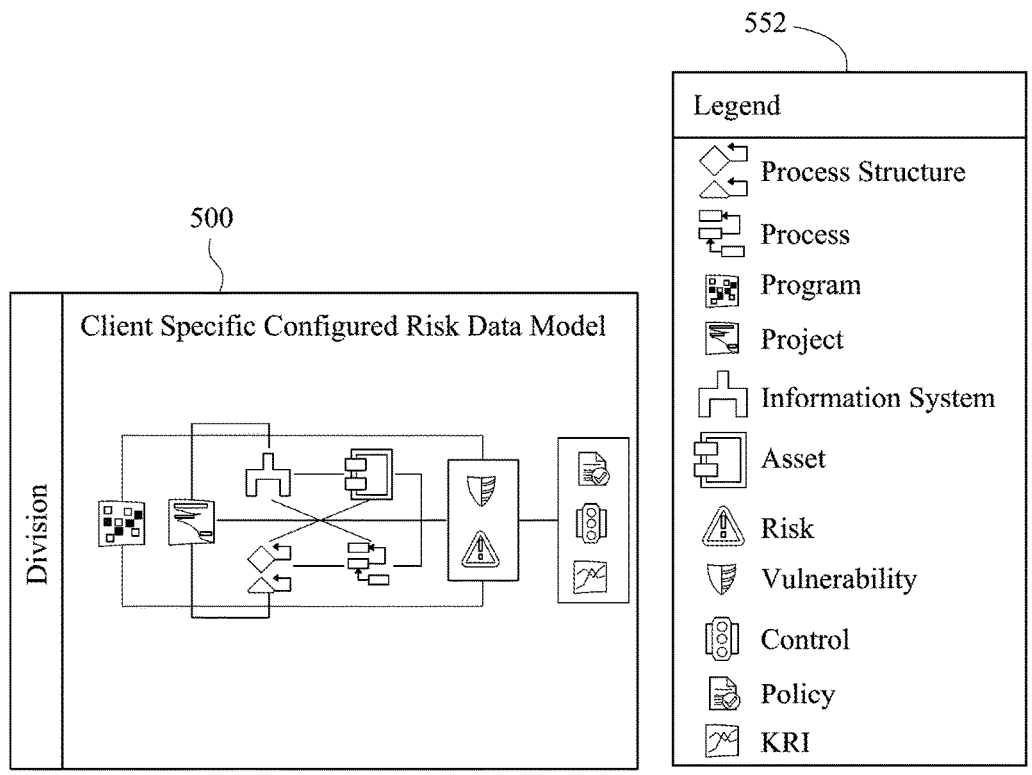

Specific risk structure for division A 550 is an implemented risk model that is based on meta-model 500 of FIG. 5A (e.g., model 550 is constrained by the meta-model 500). Legend 552 shows the definitions of the elements included in model 550. Note that not all of the model elements of the meta-model need to be included in the implemented model.

Figure 5B:
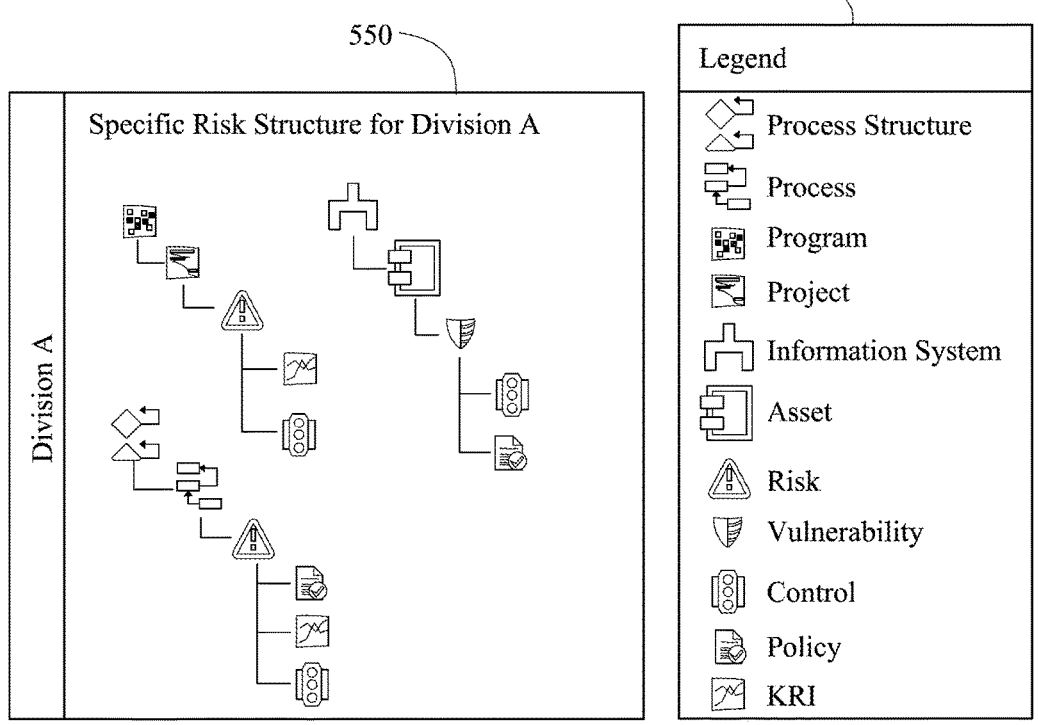

The addition of the extended elements in FIG. 5A allows for more complex risk structure to be defined as shown in FIG. 5B. In certain example embodiments, the structure shown in FIG. 5B is achieved by applying conditional logic to the meta-model elements. Such conditional logic may be initially set by an authorized user for each meta-model element. Conditional implementation of risk models then allows models to be created based on dynamic user input rather than being hard coded in the underlying meta-model, which, as described above, has certain negative aspects. The hard-coding of meta-models can limit use of complex risk structures for an organization and/or may limit the flexibility in applying software updates to an example GRC system because the underlying meta-model may be important for the proper functioning of the risk management capabilities in the GRC system.

FIGS. 6A and 6B show non-limiting example properties of an element. Object definition 600 is a field that is provided for meta-model elements. The various properties of each meta-model element are shown as field 1-9 in object definition 600. Authorized users set the conditional properties of a meta-model element such that model elements based on the meta-model element will operate in different manners based on user provided input. For example, field 6 is only visible if the value of field 3 is equal to z. Such conditional logic allows the models that are to be eventually created by users to be flexible (e.g., because of the provided conditional logic), without affecting the underlying structure of the meta-model to a significant degree.

FIG. 6B shows an example of an implemented object definition for a risk model element using object definition 600. Specifically, user (or system) provided values determine some or all of the properties of risk internal fraud element 650 (a specific implementation of a meta-model risk element). In this example, the value of field 3, which is set to "enterprise risk," determines how some of the other fields are populated and/or displayed.

Figure 7A:
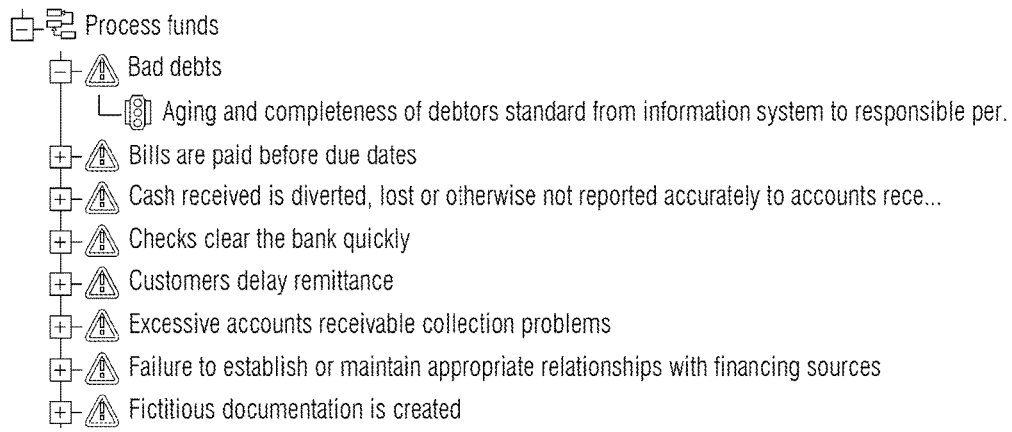
FIGS. 7A, 7B, 8A, and 8B are further examples of risk model according to certain example embodiments.
Figure 7B:
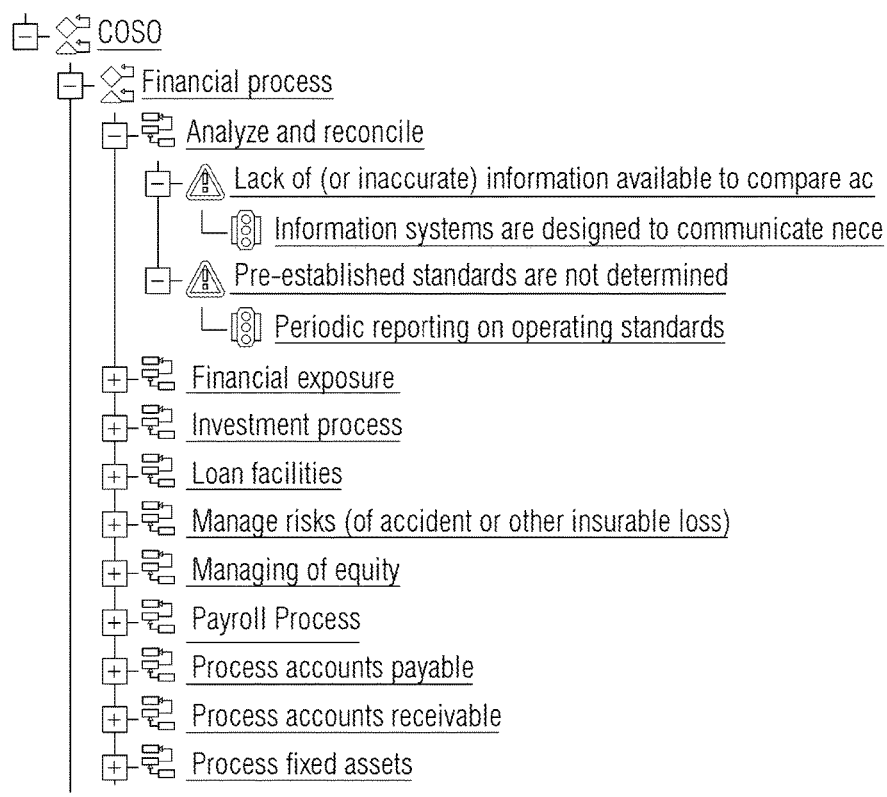

FIGS. 7A, 7B, 8A, and 8B are further non-limiting examples of risk models according to certain example embodiments. FIGS. 7A and 7B are similar to FIG. 4B where a more structured/fixed risk model is provided. Specifically each process (e.g., "process funds") is associated with a risk (e.g., "Bad debts") that is associated with a control ("e.g., Aging . . . ").

Figure 8A:
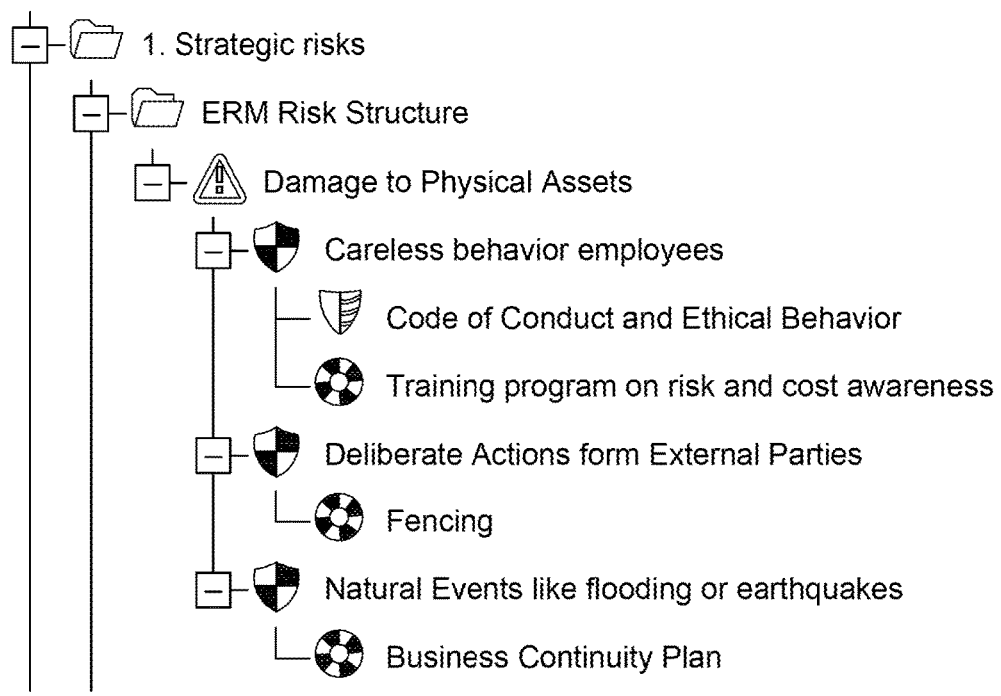
Figure 8B:
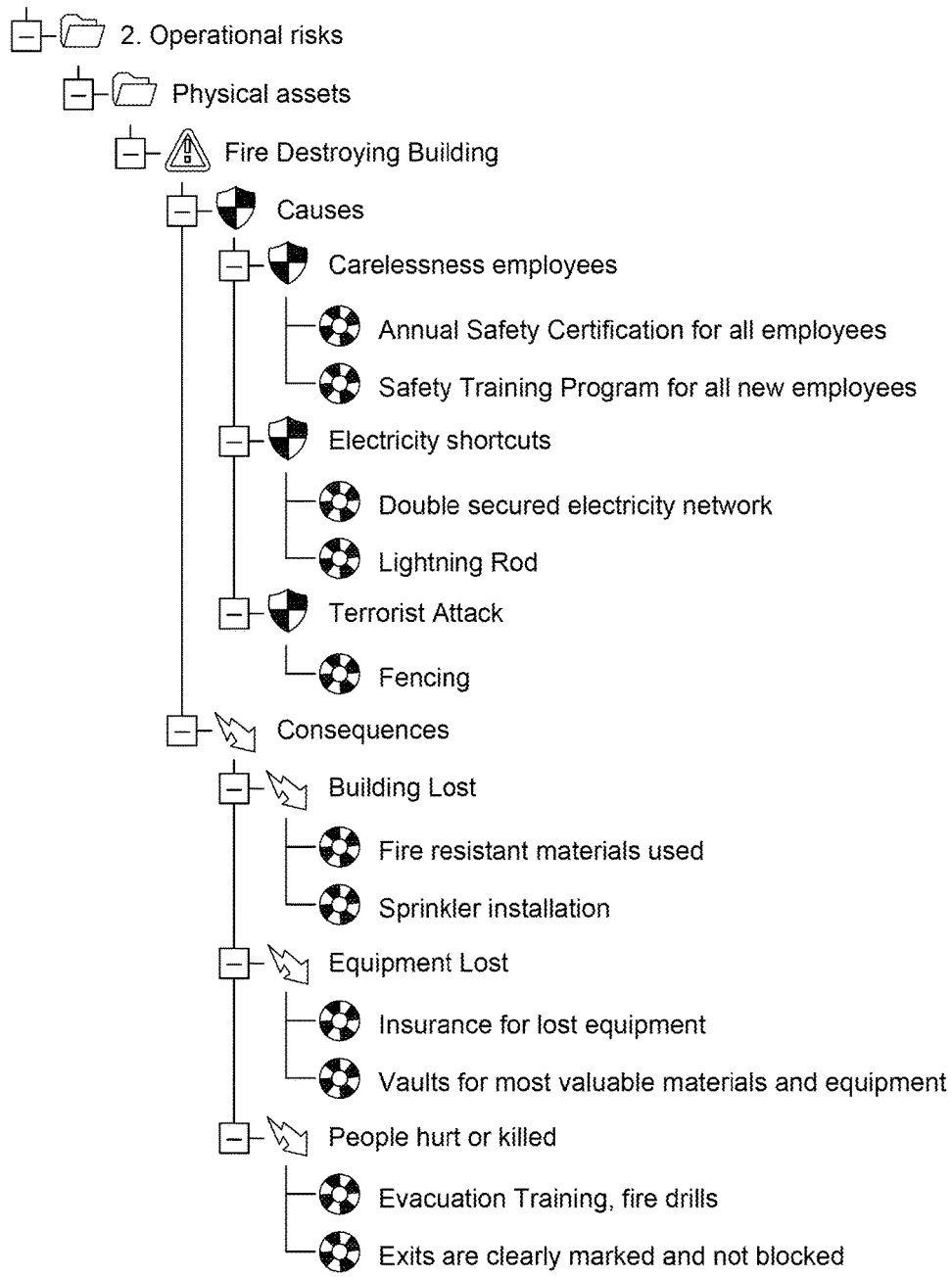

FIGS. 8A and 8B are non-limiting risk models developed in accordance with an exemplary GRC system using conditional/dynamic logic. FIG. 8A shows a first risk model implemented according to certain example embodiments. Specifically, the "damage to physical assets" risk element has 3 sub-risks associated with it that are each "causes." In this example, causes are a dynamic risk model element type related to the causes for the damage to physical assets risk element. An organization can then define the causes associated with the more general risk element of "damage to physical assets." Further, for each one of the causes can include a measure or control element and can be implemented as is shown in FIG. 8A. For example, the "code of conduct and ethical behavior" element would be a policy control element type that is associated with the causes risk element type. As with the risk elements, control or measure elements can be specifically defined and dynamically customized based on user input.

In FIG. 8B's risk model, a risk "fire destroying building" is associated with an object element "physical assets." There are two additional risk elements defined for this particular risk. The first is a "causes" element and the second is a "consequences" element. Both of these "risk" element types may have different requirements when they are implemented in a risk model. The risk models defined in FIGS. 8A and 8B may be created based on dynamic user input using a configured (e.g., extended by the customer) meta-model rather than performing modifications to an underlying fixed meta-model In certain example embodiments, a different risk model may be created. For example, cause elements may be defined under the basic risk element. However, instead of consequence elements also being defined under the basic risk element, the consequences may be defined under each individual cause element. In other words, a first risk element (causes) may have a further risk element (consequences) associated with it. This type of risk model would not normally be possible with the above fixed meta-model structure.

Figure 9:
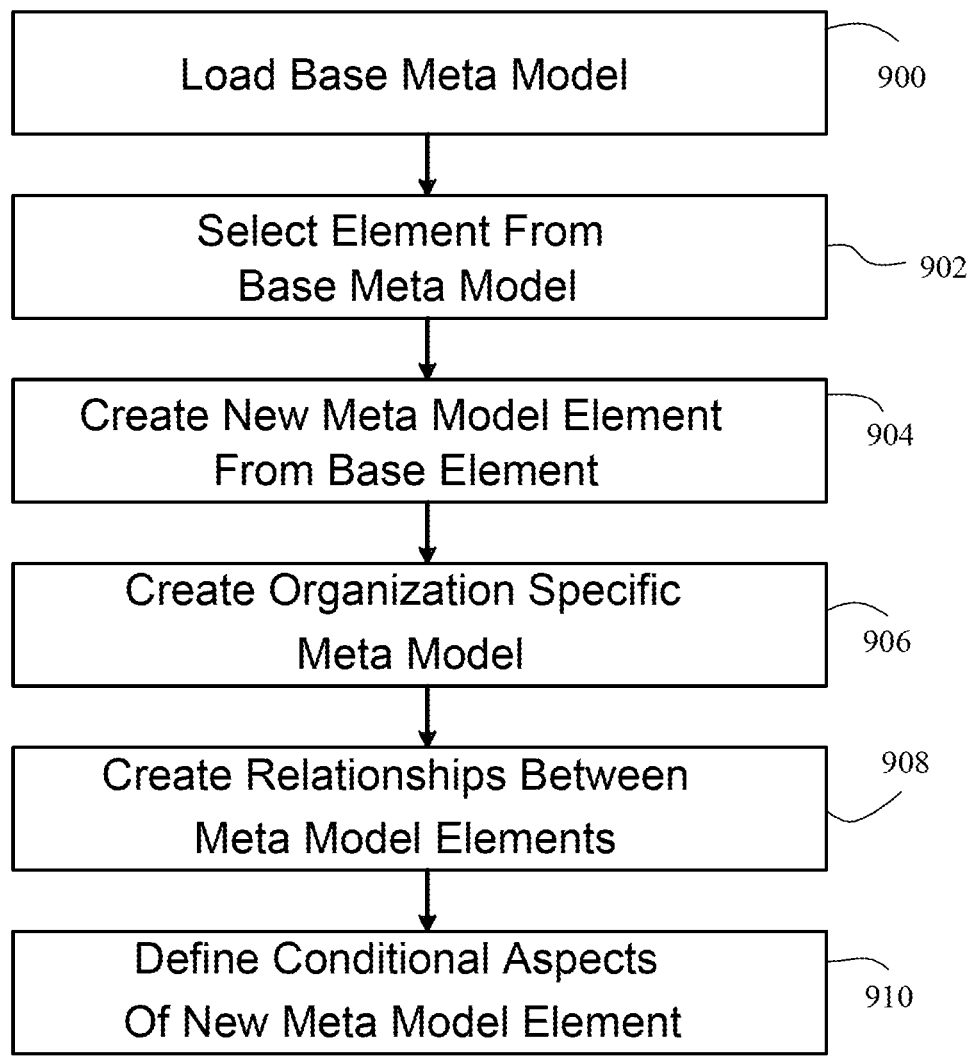
FIG. 9 is an example process for creating an extended meta-model from a base metal model.

FIG. 9 is an example process for creating an extended meta-model from a base meta-model. As explained in connection with FIG. 3, a base or fixed meta-model may be provided (e.g., from a vendor or standards organization). However, the fixed model may be too generic for the specific processes, assets, risks, etc of a given organization. Accordingly, the fixed meta-model may be extended by the implementing organization.

In step 900, the base meta-model is loaded by the GRC computer system. A graphical user interface may display the various meta-model elements of the base meta-model. In step 902, a user selects one of the meta-model elements to create a new meta-model element in step 904. As discussed above, the creation of a new meta-model element is carried out through an interface that is provided to the fixed meta-model. In step 906, a meta-model element that is specific to the organization is created. For example, the consequences meta-model element is created from a base risk meta-model element.

In step 908, relationships are defined by the user between the newly created meta-model element and the existing meta-model elements. In conjunction with the setting up these relationships, conditional aspects of the newly created meta-model element are defined—e.g., as shown in FIG. 6A. Accordingly, a new, extended, meta-model may be defined and usable by users for creating specific risk models (structures).

Figure 10:
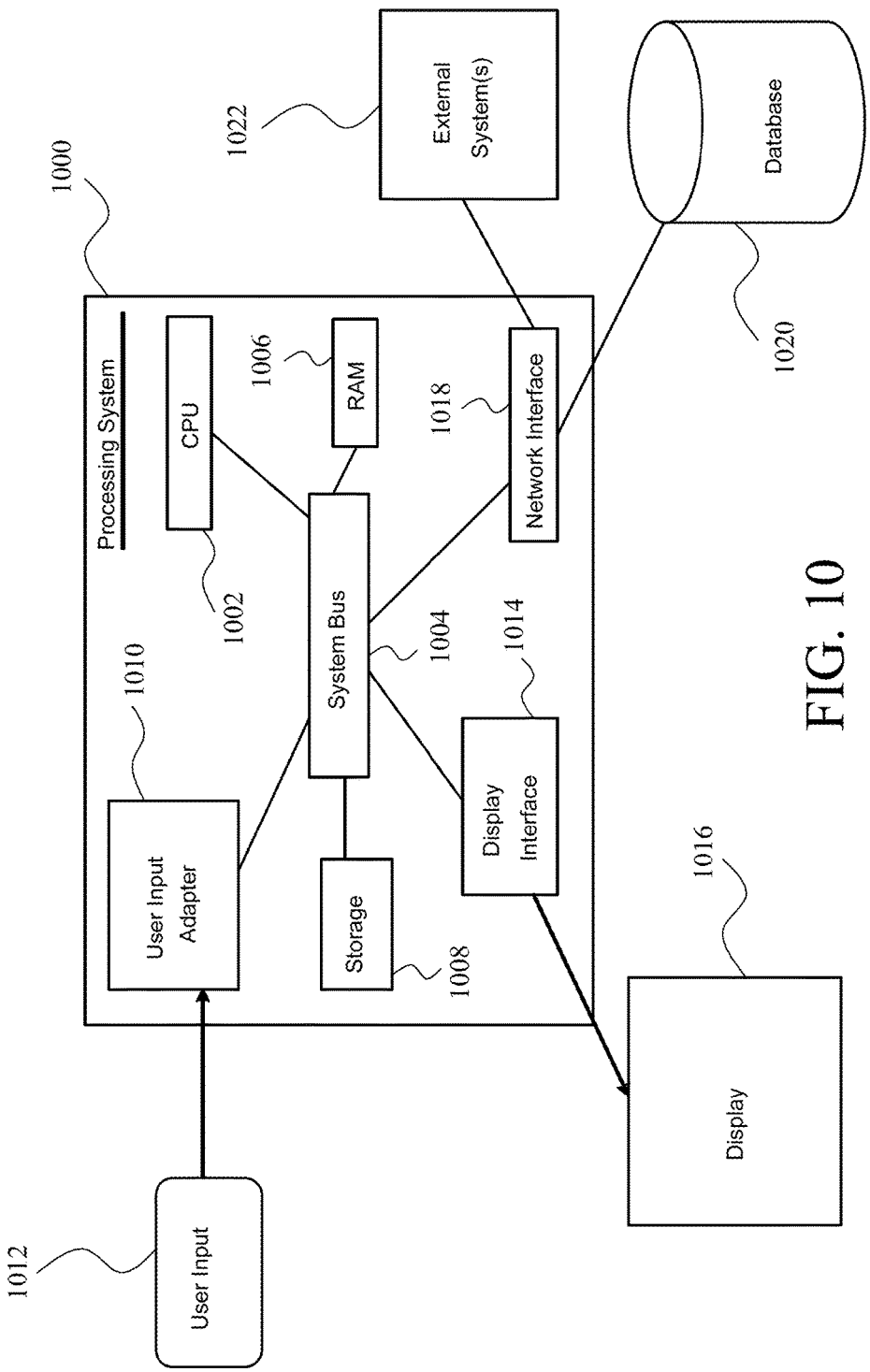
FIG. 10 is a block diagram of an exemplary computing system according to certain example embodiments.

FIG. 10 is a block diagram of an exemplary computing system according to certain example embodiments. A processing system 1000 includes a central processing unit or CPU 1002, a system bus 1004 that communicates with RAM 1006, and storage 1008. The storage 1008 can be magnetic, flash based (e.g., for a mobile client device), solid state, or other storage technology. The system bus 1004 communicates with user input adapter 1010 (e.g., a PS/2, USB interface, or the like) that allows users in input commands to processing system 1000 via a user input device 1012 (e.g., a keyboard, mouse, touch panel, or the like). The results of the processing may be displayed to a user on a display 1016 (e.g., an LCD) via display interface 1014 (e.g., a video card or the like).

The processing system 1000 may also include a network interface 1018 (e.g., a transceiver) to facilitate wired (e.g., Ethernet—802.3x) and/or wireless communication (WiFi/802.11x protocols, cellular technology, and the like) with external systems 1022 and/or databases 1020. External systems 1022 may include other processing systems, systems that provide third party services, etc. Here, external systems 1022 may be client devices or server systems. For example, a server system may be a server that provides GRC functionality to clients over the Internet via a web browser or other thin (or thick) client system.

External systems 1022 may also include network attached storage (NAS) to hold large amounts of data (e.g., thousands or millions of electronic documents, meta-models, etc). External systems, along with the internal storage and memory, may form a storage system for storing and maintaining information (e.g., documents, meta-models, define models, etc). Such a system many communicate with user and other computing resources (e.g., a client device, server, etc) to provide GRC functionality webcasts. The database 1020 may include relational, object orientated, or other types of databases for storing information (e.g., defined risk models or meta-models).

In other words, the processes, techniques, and the like, described herein (for both client devices and server or controller systems) may be implemented on a computing system. Such implementations may then configure or program a processing system to carry out aspects according to certain example embodiments. It will be appreciated that other architecture types may be used. For example, a CPU may include multiple CPU "cores." In certain example embodiments, the display 1016 may be paired with a touch panel to create a touch screen display device. Further, the various elements shown in connection with FIG. 10 and/or FIG. 1 may be included into one cohesive physical structure (e.g., such as a tablet device). For example, the display, user input, and processing system may be included in the same housing or structure.

In certain examples, the GRC system is provided as software as a service (SoA) (e.g., cloud based computing) where users provide input from a local computing device that is transmitted over the Internet for processing by a remote GRC system. The remote GRC system then sends back information to render a local display of a created model for the user.

Thus, in certain example embodiments, dynamic risk structures can be implemented that rely upon a fixed meta-model (e.g., as shown in FIG. 4A). The use of a fixed meta-model (or an extended meta-model based on the standard) provides added stability and decreases the total cost of the GRC system. Traditional GRC implementations have either been too rigid (fixed structure) or too flexible. For systems that are too flexible, while any structure can be made, they could also not offer standard capabilities for performing effectiveness tests, risk assessments, audits, and compliance assessments without the need for customization and re-programming. Accordingly, in certain example embodiments, a GRC solution is provided that allows clients to operate from a common structure (a fixed meta-model), which does not require specific code requirements when implementing the variety of the specific risk structures that are demanded by clients. Thus, organizations can thus leverage existing standard capabilities, like risk assessments, audits, and compliance assessment without further adaptations. The possible risk structures that can be captured and described can thus be very large without the need for customized coding. This ultimately decreases the total cost of ownership (TCO) of an example GRC system (e.g., because no dedicated programmers are needed to implemented dynamic risk models).

The description herein has been provided for purposes of explanation and non-limitation (e.g., specific details such as particular nodes, functional entities, techniques, protocols, standards, etc. in order to provide an understanding of the described technology). It will apparent to one skilled in the art that other embodiments may be practiced apart from the specific details disclosed below. In other instances, detailed descriptions of well-known methods, devices, techniques, etc. are omitted so as not to obscure the description with unnecessary detail.

Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), and/or using one or more digital signal processors (DSPs). The software program instructions and data may be stored on computer-readable storage medium and when the instructions are executed by a computer or other suitable processor control, the computer or processor performs the functions.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred. A description of a process may be a description of an apparatus for performing the process. The apparatus that performs the process can include, e.g., a processor and those input devices and output devices that are appropriate to perform the process.

Various forms of computer readable media may be involved in carrying data (e.g., sequences of instructions) to a processor. For example, data may be (i) delivered from RAM to a processor via a computer bus; (ii) carried over a wireless transmission medium; (iii) formatted and/or transmitted according to numerous formats, standards or protocols, such as Ethernet (or IEEE 802.3x), SAP, ATP, Bluetooth, and TCP/IP, TDMA, CDMA, 3G, etc.; and/or (iv) encrypted to ensure privacy or prevent fraud in any of a variety of ways well known in the art.

Although various embodiments have been shown and described in detail, the claims are not limited to any particular embodiment or example. None of the above description should be read as implying that any particular element, step, range, or function is essential. All structural and functional equivalents to the elements of the above-described preferred embodiment that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, component, or step in this specification is intended to be dedicated to the public.

The invention claimed is:

1. A system that provides governance, risk management, or compliance functionality, the system comprising:
    an electronic storage system configured to store a risk meta-model that includes (a) a plurality of object elements, (b) a plurality of dynamic risk elements, and (c) a plurality of dynamic control elements, the risk meta-model including a first relationship constraint and a second relationship constraint that is different from the first relationship constraint;
    a processing system that includes at least one hardware processor, the processing system configured to:
        receive first input for modifying or creating a dynamic risk model that is based on the risk meta-model stored in the storage system, the dynamic risk model including an object element that is from the plurality of object elements included in the risk meta-model;
        based on second input, add a first dynamic risk element from the plurality of dynamic risk elements of the risk meta-model to the dynamic risk model;
        as a result of addition of the first dynamic risk element, trigger the first relationship constraint of the risk meta-model to link the first dynamic risk element to the object element;
        based on third input, add a first dynamic control element that is from among the plurality of dynamic control elements of the risk meta-model, wherein the first dynamic control element includes a plurality of fields; and
        as a result of addition of the first dynamic control element, trigger the second relationship constraint of the risk meta-model to link the first dynamic control element to the added first dynamic risk element,
    wherein a visibility property of a second one of the plurality of fields of the first dynamic control element is controlled based on a first field of the plurality of fields being set to a predetermined value.

2. The system of claim 1, wherein the processing system is further configured to:
    generate data for a graphical representation of the new dynamic risk model that is to be displayed on a display device, the graphical representation including graphical elements to represent the first dynamic risk element, first dynamic control element, the object element, a first link between the first dynamic risk element and the object element, and a second link between the first dynamic control element and the first dynamic risk element.

3. The system of claim 2, wherein the processing system is further configured to:
    transmit, via a transceiver, the generated data to a client computer system for display on the display device that is coupled thereto.

4. The system of claim 1, wherein the processing system is further configured to:
    add, based on received input, a second dynamic risk element from the plurality of dynamic risk elements to the dynamic risk model; and
    link, based on a determined risk type of the second dynamic risk element, the second dynamic risk element to the first dynamic risk element.

5. The system of claim 1, wherein at least some of the plurality of fields of the first dynamic control element are configured to accept user provided input values.

6. The system of claim 1, wherein the processing system is further configured to automatically set a control type of the first dynamic control element based on a value stored in at least one of the plurality of fields of the first dynamic control element.

7. The system of claim 1, wherein the visibility property is additionally controlled based on conditional logic structure that is included in the risk meta-model.

8. The system of claim 1, wherein the processing system is further configured to output, to a display device that is coupled to the processing, a tree view of the dynamic risk model.

9. The system of claim 1, wherein the risk meta-model is based on a first fixed meta-model that includes at least one conditional constraint that constrains, in combination with the first relationship constraint and the second relationship constraint of the risk meta-model, how the dynamic risk model may be created.

10. The system of claim 9, wherein the processing system is further configured to replace, after creation of the dynamic risk model, the first fixed meta-model with a second, different, fixed meta-model,
    wherein after replacement of the first fixed meta-model, the previously created dynamic risk model is properly supported via the risk meta-model that is now based on the second fixed meta-model.

11. A computer implemented method of modifying or generating a dynamic risk model from a risk meta-model using a computer system that provides governance, risk management, and compliance (GRC) functionality, the computer system including at least one hardware processor, the risk meta-model including (a) a plurality of object elements, (b) a plurality of dynamic risk elements, and (c) a plurality of dynamic control elements, the risk meta-model including a first relationship constraint and a second relationship constraint that is different from the first relationship constraint, the method comprising:
    adding, to a dynamic risk model, an object element that is from the plurality of object elements of the risk meta-model;
    adding, to the dynamic risk model, a first dynamic risk element that is from the plurality of dynamic risk elements of the risk meta-model;
    triggering, based on addition of the first dynamic risk element, the first relationship constraint of the risk meta-model to link the first dynamic risk element to the object element;
    adding, to the dynamic risk model, a first dynamic control element that is from among the plurality of dynamic control elements of the risk meta-model, wherein the first dynamic control element includes a plurality of fields;

triggering, based on addition of the first dynamic control element, the second relationship constraint of the risk meta-model to link the first dynamic control element with the first dynamic risk element; and based on a first field of the plurality of fields being set to a first value, controlling a visibility of another field of at least one model element of the dynamic risk model.

12. The method of claim 11, further comprising:

outputting data for a graphical representation of the dynamic risk model to be displayed on a display device, the graphical representation including graphical elements to represent the first dynamic risk element, first dynamic control element, the object element, the link of the first dynamic risk element to the object element, and the link of the first dynamic control element to the first dynamic risk element.

13. The method of claim 12, further comprising:

transmitting, via a transceiver, the generated data to a client computer system for display on the display device that is coupled thereto.

14. The method of claim 11, further comprising:

adding, based on received input, a second dynamic risk element from the plurality of dynamic risk elements to the dynamic risk model; and linking, based on a determined risk type of the second dynamic risk element, the second dynamic risk element to the first dynamic risk element.

15. The method of claim 11, wherein the another field is a second field of the plurality of fields of the first dynamic control element.

16. The method of claim 11, further comprising:

setting a control type of the first dynamic control element based on a value in at least one of the plurality of fields of the first dynamic control element.

17. The method of claim 11, wherein the visibility is additionally controlled based on conditional logic included in the risk meta-model.

18. A non-transitory computer readable storage medium storing instructions for execution by a computer system that provides governance, risk management, and compliance (GRC), the computer system including at least one processor and a storage system configured to store a risk meta-model for an organization that includes (a) a plurality of object elements, (b) a plurality of dynamic risk elements, and (c) a plurality of dynamic control elements, the risk meta-model including a set of enforceable rules including a first relationship constraint and a second relationship constraint that is different from the first relationship constraint, the stored instructions comprising instructions that, when executed by the at least one processor, cause the computer system to:

add, based on received input, an object element to a dynamic risk model, the object element being based on one of the plurality of object elements included in the risk meta-model;

add, based on received input, a first dynamic risk element to the dynamic risk model, the first dynamic risk element being based on one of the plurality of dynamic risk elements of the risk meta-model;

based on addition of the first dynamic risk element to the dynamic risk model, trigger the first relationship constraint of the extended risk meta-model to automatically add, to the dynamic risk model, a first link between the first dynamic risk element and the object element;

add, based on received input, a first dynamic control element to the dynamic risk model, the first dynamic control element being based at least one of the plurality of dynamic control elements of the extended risk meta-model, wherein the first dynamic control element includes a plurality of fields; and based on addition of the first dynamic control element to the dynamic risk model, trigger the second relationship constraint of the extended risk meta-model to automatically add, to the dynamic risk model, a second link between the first dynamic control element and the first dynamic risk element, wherein a first field of the plurality of fields controls visibility of another, different, field of at least one model element of the dynamic risk model based on the first field being set to a first value.

19. The non-transitory computer readable storage medium of claim 18, wherein the stored instructions comprise further instructions that, when executed by the at least one processor, cause the computer system to:

output data for a graphical representation of the dynamic risk model to be displayed on a display device, the graphical representation including graphical elements to represent the first dynamic risk element, first dynamic control element, the object element, the link of the first dynamic risk element to the object element, and the link of the first dynamic control element to the first dynamic risk element.

20. The non-transitory computer readable storage medium of claim 18, wherein the stored instructions comprise further instructions that, when executed by the at least one processor, cause the computer system to:

add, based on received input, a second dynamic risk element from the plurality of dynamic risk elements to the dynamic risk model; and link, based on a determined risk type of the second dynamic risk element, the second dynamic risk element to the first dynamic risk element.

* * * * *